Aug. 25, 1970   C. W. YAGER ET AL   3,525,225

METHOD OF INSTALLING EARTH ANCHORS

Filed Feb. 27, 1968

INVENTORS
Carl W. Yager
Dale D. Watson

BY Schmidt, Johnson, Hovey,
Williams & Bradley
ATTORNEYS.

United States Patent Office 3,525,225
Patented Aug. 25, 1970

3,525,225
METHOD OF INSTALLING EARTH ANCHORS
Carl W. Yager and Dale D. Watson, Centralia, Mo., assignors to A. B. Chance Company, Centralia, Mo., a corporation of Missouri
Filed Feb. 27, 1968, Ser. No. 708,643
Int. Cl. E02d 5/80; G01n 3/04
U.S. Cl. 61—53.5      6 Claims

ABSTRACT OF THE DISCLOSURE

A screw type earth anchor is installed in the ground by advancing it downwardly thereinto until the torque load thereon reaches a value which indicates that the anchor has acquired the required holding power. The anchor rod is coupled with the drive shaft of power installing apparatus by a torque limiting device which uncouples the anchor rod from the drive shaft when a selected torque load is reached.

---

Screw type earth anchors are widely utilized as a means of anchoring guy lines for telephone poles, electric power utility poles, and high voltage transmission line tower structures. In the installation of a screw type earth anchor, it is requisite that the anchor be advanced into the ground until the helix or helices thereof reach subsoil having a density that imparts the desired holding power to the anchor. Particularly in heavy load applications, a power digger is employed to screw the anchor into the ground to the proper depth. The greater the soil density the greater the torque required to install the anchor. Thus, a fixed relationship exists between the torque required to install a particular screw anchor and the tension load which it will support once installed. As the required installation torque increases, the holding power of the anchor likewise increases.

Heretofore, it has been the practice to determine the density of the subsurface soil at an installation site utilizing a soil test probe. The probe is a mechanical instrument which is manually screwed into the ground and, as it displaces the earth, probe readings are taken in inch-pounds as measured on a torque gauge built into the operating handle. Higher torque readings are obtained in soils of greater density, such readings being utilized to determine the depth to which the anchors should be installed at the site.

Although the installation of earth anchors based on test probe readings has proven to be quite satisfactory as compared with considerably less exacting techniques previously utilized, it is manifest that probing is time-consuming and suffers from the disadvantage that anchor depth is based upon approximations derived from a number of probe samplings which may not be accurate with respect to a given anchor location. Of course, it would be impractical to probe each individual anchor location.

It is, therefore, the primary object of this invention to provide an improved method of installing screw earth anchors which does not include preliminary probing and is based on the actual soil conditions at each individual anchor location.

As a corollary to the foregoing object, it is an important aim of this invention to provide a method of installing screw anchors in which the installation screw is made aware of whether or not the anchor penetrates the desired subsoil and thus acquires the required holding power, in order that an installation which may later fail will be known at the time of installing the anchor so that the anchor may be re-installed at a different location where proper subsoil conditions are available.

In the practice of the method of the instant invention, the installation depth of each anchor is controlled by limiting the torque load on the anchor during installation thereof. In this manner, as will be discussed more fully hereinafter, the depth is dependent upon the density of the subsoil which is reached and penetrated by the anchor, the maximum torque load being set to assure that the anchor will actually penetrate the subsoil of desired density and acquire the required holding power.

Figure 1:
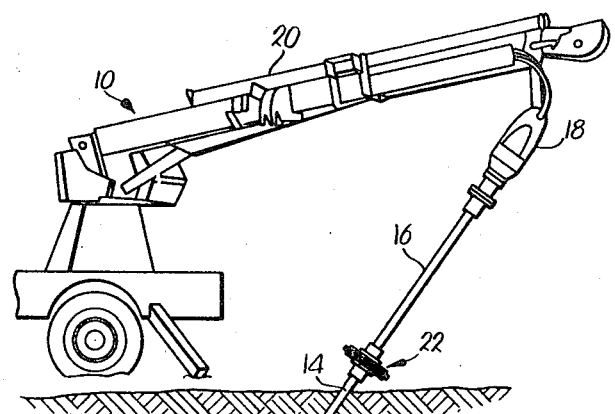
FIG. 1 is a view illustrating a power digger as used in the installation of a screw earth anchor.

In FIG. 1, a power digger 10 is shown of the type commonly utilized to drive an earth auger or install screw anchors. The digger 10 is illustrated installing a multiple helix earth anchor 12 in the ground, the anchor 12 having a rod or shaft 14 coupled to the Kelly bar or drive shaft 16 of a hydraulic motor 18 carried by the outboard end of the boom 20 of digger 10. A torque limiting device 22 couples rod 14 with bar 16 and serves both as a torque wrench for transmitting axial and rotative driving forces from bar 16 to rod 14, and as a torque limiter which uncouples rod 14 from bar 16 when the torque load on anchor 12 reaches a predetermined maximum value.

Figure 3:
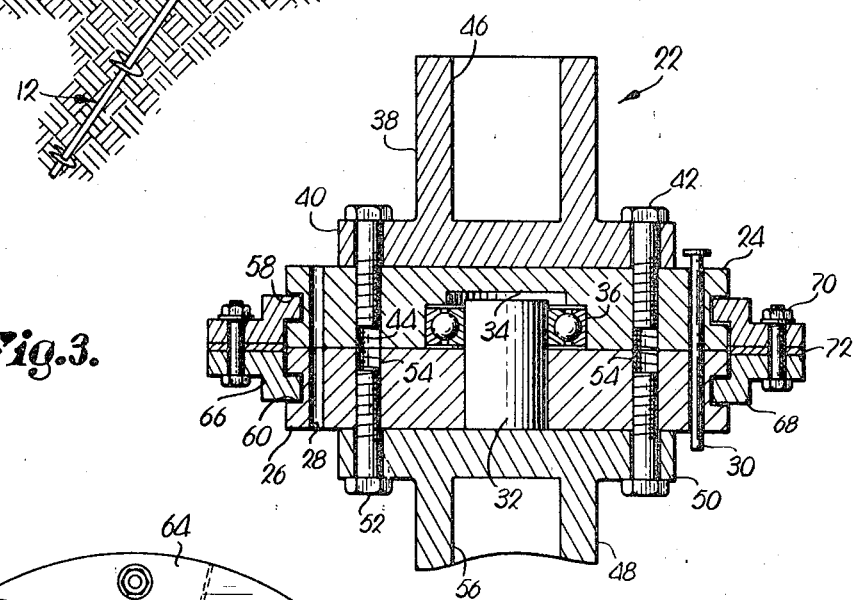
FIG. 3 is a cross-sectional view of the device taken along line 3—3 of FIG. 2.
Figure 2:
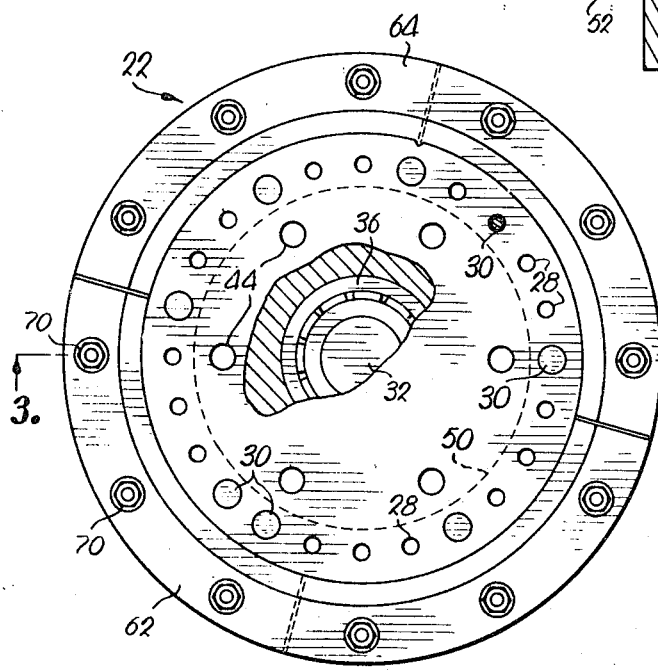
FIG. 2 is a plan view of a torque limiting device employed with the power digger, the drive adapter of the device being removed.

The device 22 is shown in detail in FIGS. 2 and 3. A pair of normally upper and lower shear heads in the form of disc-shape dplates 24 and 26 are each provided with a circular row of openings 28 therein, the openings 28 in the plates 24 and 26 being aligned to receive a plurality of shear pins 30 shown as ordinary nails. The lower plate 26 has a central bore into which an aligning stud 32 is pressed, the stud 32 projecting from the upper surface of plate 26 into a bearing cavity 34 in the undersurface of the upper plate 24. A ball bearing 36 is seated in bearing cavity 34 and receives the stud 32, the latter thus serving as a spindle about which plate 24 may rotate when pins 30 are removed or upon shearing thereof.

A drive adapter 38 is flanged at 40 and is rigidly secured to the upper surface of plate 24 by a series of bolts 42 which extend through flange 40 and into tapped bolt holes 44 in plate 24. The adapter 38 is provided with a normally upwardly projecting socket portion 46 which complementally receives the normally lowermost end of the Kelly bar 16.

Similarly, a driven adapter 48 has a normally uppermost flange 50 and is secured to the bottom face of lower plate 26 by a series of bolts 52 which extend through flange 50 and into tapped holes 54 in plate 26. Adapter 48 is provided with a depending socket portion 56 which complementally receives the uppermost end of the anchor rod 14. Cross pins (not shown) extending through sockets 46 and 56 and the shafts therewithin would normally be employed.

The upper plate 24 is provided with a circumferential groove 58 and the lower plate 26 is provided with a similar circumferential groove 60. A retainer comprises four semicircular sections 62, 64, 66 and 68 and is held together as a unit by a row of nut and bolt assemblies 70. The two upper sections 62 and 64 fit into groove 58 in plate 24 and the two lower sections 66 and 68 fit into groove 60 in plate 26, the upper and lower sections being spaced apart by an annular shim 72.

As is clear in FIG. 2, the upper retainer sections 62, 64 and the lower retainer sections 66, 68 are displaced 90° from each other so that a retainer ring is effectively formed when the four sections 62–68 are bolted together. The lips (see FIG. 3) formed by the inner edges of the retainer sections are substantially complemental to the grooves 58 and 60 but sufficient clearance is provided to permit rotation of plate 24 about the axis of stud 32 in the absence of the pins 30. However, the retainer positively prevents axial separation of plates 24 and 26, the internal faces of the latter providing cutting edges at the openings 28 since the plates 24 and 26 are flush against each other. The plates 24 and 26 are preferably made of quenched and tempered tool steel.

In the use of the device 22 as a torque limiter, a number of pins 30 are selected depending upon the maximum torque to be permitted. Eight pins 30 are illustrated in FIG. 2 and are disposed at random in eight of the openings 28. Utilizing shear plates 24 and 26 having a diameter of 8½ inches, common 40 penny nails are satisfactory for the pins 30. The device 22 of this size will readily handle applied torque on the order of 12,000 foot-pounds, such as may be experienced in the installation of earth anchor 12.

The maximum torque which the device 22 will transmit from Kelly bar 16 to anchor rod 14 is determined by the combined shear strength of the pins 30 utilized; therefore, it will be appreciated that a wide value of torque limits may be accommodated. Furthermore, additional circular rows of openings at different radii may be added to provide virtually unlimited torque increments up to the capacity of the device.

As discussed earlier in this specification, a direct relationship exists between the torque required to install a particular screw anchor and the load which the anchor will support once installed. Therefore, once the value of the desired installation torque is determined, the selection of the proper number of pins 30 will assure that the torque applied to anchor 12 will be limited to such value. As the anchor is driven into the ground, advancement thereof ceases when the maximum torque load level is reached and the pins 30 shear thereby instantaneously uncoupling the rotative force from the anchor 12.

By way of an example of the preferred manner of practicing the method of the instant invention, it may be desired that an anchor shall require an installation torque value of not less than 6,000 foot-pounds to produce a required holding power with a predetermined maximum torque load level of 6,500 foot-pounds contemplated. A sufficient number of pins 30 is placed through holes 28 to shear at this 6,000 foot-pound value of torque load. The anchor 12 is then advanced into the subsoil, such advancement of the anchor being effected by the application of combined axial and rotative driving forces thereto by the rotation of Kelly bar 16 and downward axial movement thereof as the boom 20 is lowered. The anchor is advanced until it reaches subsoil where the torque load increased to the predetermined value whereby the pins 30 shear, uncoupling the anchor from the rotative and axial drive forces.

Before shearing occurs, it may be necessary to add extensions to anchor rod 14. But, ultimately, when subsoil is reached having sufficient density to load the anchor to 6,000 foot-pounds, shearing of the pins occurs uncoupling the drive forces and the anchor is driven no further. Thereafter, more pins 30 than originally used are inserted into openings 28 thereby recoupling the anchor 12 with the rotative and axial drive forces and the power digger 10 is again operated to continue downward advancement of anchor 12. It is assumed that the additional pins raise the maximum torque to the predetermined 6,500 foot-pound level, greater than the minimum required but still below the torque that will cause failure of the anchor rod 14.

The progress of the advancing anchor is carefully watched during this second application of torque in the range from 6,000 to 6,500 foot-pounds. If the anchor advances two or three feet, for example, before shearing of the pins at the 6,500 foot-pound load and simultaneous instantaneous uncoupling of the rotative and axial drive forces occurs, when the installation screw is assured that the anchor is properly installed. It should be understood, of course, that two or three feet is purely exemplary and would vary with the anchor configuration, but the example illustrates an important aspect of the method of the instant invention. The first phase of the method whereby the anchor is advanced until the torque load developed thereon reaches a value less than the maximum predetermined load level (shearing at 6,000 foot-pounds) indicates that the anchor has reached subsoil of a density which will impart the desired holding power to the anchor. However, the shearing at 6,000 foot-pounds could also indicate that the anchor has struck a rock stratum. This would be confirmed in the second phase of the method when shearing occurs at the maximum predetermined load level of 6,500 foot-pounds, since such shearing will occur without substantial advancement of the anchor if it has struck an obstacle rather than subsoil of the desired density. Therefore, the second phase of the method assures that the anchor penetrates a subsoil which may be relied upon to impart the required holding power thereto.

It may be appreciated that the foregoing method is accomplished without the use of a soil probe, the actual anchor depth being of no significance since the depth (beyond a certain minimum) is not the determining factor in providing the required holding power. Furthermore, in the instant invention the anchor is installed at some torque value greater than the minimum required to produce the necessary holding power.

If desired, other suitable means of limiting the torque load or registering the applied torque may be employed in place of the torque limiter 22; however the latter is simple in construction and is not dependent on friction or clutch devices for its operation. The shear pins 30 are of uniform strength, readily obtainable in large quantities, and of very low cost. Since fresh pins are used each time and loaded until they shear, no question arises concerning reproducible torque values. Also, when the required torque is reached, the pins shear and application of load to the driven shaft is cut off without any action of the operator.

Having thus described the invention, what is claimed as new and desired to be secured by Letters Patent is:

1. A method of installing a screw earth anchor in subsoil having a greater density than the earth thereabove and having the desired holding power for the anchor, but wherein said subsoil is at an unknown depth, said method comprising the steps of:
  connecting a screw anchor with a source of simultaneously operable axial and rotative driving forces through a coupling operable to provide relatively instantaneous uncoupling of the anchor from the rotative force at a predetermined torque load level;
  energizing said source to advance said anchor into the earth; and
  continuing application of said axial and rotative driving forces to the anchor until the same reaches subsoil where the torque load on the anchor increases to said predetermined level whereby,
  relatively instantaneous uncoupling of said rotative force from the anchor occurs as a resultant of the increased torque load thereon thus assuring advancement of the anchor into the subsoil a distance sufficient to hold the same in place.

2. The method as set forth in claim 1, wherein is provided the additional steps of:
  prior to said uncoupling of the rotative force from the anchor as a resultant of the increased torque reaching said predetermined level, first continuing application of said rotative and axial driving forces to the anchor as a resultant of the increased torque reach-reaches a value less than said predetermined level but which signifies that the anchor has reached said subsoil whereby relatively instantaneous uncoupling of said rotative force from the anchor occurs as a resultant of the increased torque load reaching said value; and thereafter reapply axial and rotative driving forces to the anchor until the resistance to rotation thereof increases to said predetermined torque level, whereby to assure that said value of torque load is induced by penetration into said subsoil.

3. The method as set forth in claim 2, wherein is included the additional step of discontinuing application of said axial drive force subsequent to each uncoupling of the anchor from said rotative force.

4. In the power installation of a screw earth anchor utilizing power operated anchor-driving apparatus having a rotatable and axially shiftable drive shaft, a method of installing said anchor in subsoil having a greater density that the earth thereabove and having the desired holding power for the anchor, but wherein said subsoil is at an unknown depth, said method comprising the steps of:

providing a drive coupling between the shaft and the anchor operable to provide relatively instantaneous uncoupling of the anchor from the rotative force at a predetermined torque load level;

energizing said apparatus to simultaneously apply axial and rotative driving forces to the anchor and advance the same into the earth;

continuing said advancement of the anchor until the same reaches subsoil where the torque load on the anchor increases to said predetermined value whereby relatively instantaneous uncoupling of said rotative force from the anchor occurs as a resultant of the increased torque load thereon thus assuring advancement of the anchor into the subsoil a distance sufficient to hold the same in place.

5. The method as set forth in claim 4, wherein is provided the additional steps of:

prior to said uncoupling of said rotative force from the anchor as a resultant of the increased torque load reaching said predetermined level, first continuing application of said rotative and axial driving forces to the anchor until the torque load developed thereon reaches a value less than said predetermined level but which signifies that the anchor has reached said subsoil whereby relatively instantaneous uncoupling of said relative force from the anchor occurs as a result of the increased torque load reaching said value; and thereafter operating said apparatus to again apply axial and rotative driving forces to the anchor until the resistance to rotation thereof increases to said predetermined torque level, whereby to assure that said value of torque load is induced by penetration into said subsoil.

6. The method as set forth in claim 5, wherein each uncoupling of the rotative force from the anchor is accomplished by uncoupling the anchor from the axial drive force, and wherein is provided the further steps of recoupling the anchor to said axial and rotative forces of said apparatus prior to said operating of the apparatus to again apply axial and rotative driving forces to the anchor.

References Cited

UNITED STATES PATENTS

| 2,761,300 | 9/1956 | Gredell | 64—28 |
| 3,080,749 | 3/1963 | Hollander | 73—84 |
| 3,148,510 | 9/1964 | Sullivan | 61—53.68 |
| 3,356,163 | 12/1967 | Rowe et al. | 61—53.5 |

JACOB SHAPIRO, Primary Examiner

U.S. Cl. X.R.

61—63; 52—155; 73—84; 64—28

PO-1050
(5/69)

UNITED STATES PATENT OFFICE
CERTIFICATE OF CORRECTION

Patent No. 3,525,225      Dated October 6, 1970

Inventor(s) CARL W. YAGER and DALE D. WATSON

It is certified that error appears in the above-identified patent and that said Letters Patent are hereby corrected as shown below:

Column 1, line 65, delete "screw" and substitute -- crew --.

Column 2, line 32, delete "shape" and substitute -- shaped --. Same line, delete "Dplates" and substitute -- plates --.

Column 4, line 1, delete "when" and substitute -- then --. Same line, delete "screw" and substitute --crew --.

Column 5, line 17, delete "that" and substitute -- than --.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents (Dkt. #12759)

UNITED STATES PATENT AND TRADEMARK OFFICE
Certificate

Patent No. 3,525,225             Patented August 25, 1970

Carl W. Yager and Dale D. Watson

Application having been made by Carl W. Yager and Dale D. Watson, the inventors named in the patent above identified, and A. B. Chance Company, Centralia, Missouri, a corporation of Missouri, the assignee, for the issuance of a certificate under the provisions of Title 35, Section 256, of the United States Code, adding the name of Milton E. Landry as a joint inventor, and a showing and proof of facts satisfying the requirements of the said section having been submitted, it is this 26th day of July 1977, certified that the name of the said Milton E. Landry is hereby added to the said patent as a joint inventor with the said Carl W. Yager and Dale D. Watson.

FRED W. SHERLING,
*Associate Solicitor.*